United States Patent [19]

Reichert et al.

[11] Patent Number: 5,868,912
[45] Date of Patent: Feb. 9, 1999

[54] ELECTROCHEMICAL CELL HAVING AN OXIDE GROWTH RESISTANT CURRENT DISTRIBUTOR

[75] Inventors: David Lee Reichert, Boothwyn, Pa.; Charles Collmar Seastrom, New Castle, Del.; Vinci Martinez Felix, Kennett Square, Pa.; Clarence Garlan Law, Jr., West Trenton, N.J.; James Arthur Trainham, III, Greenville, Del.; John Scott Newman, Kensington, Calif.

[73] Assignee: E. I. du Pont de Nemours and Company, Wilmington, Del.

[21] Appl. No.: 962,640

[22] Filed: Nov. 3, 1997

Related U.S. Application Data

[63] Continuation of Ser. No. 834,014, Apr. 11, 1997, which is a continuation of Ser. No. 432,403, May 1, 1995, abandoned, which is a continuation-in-part of Ser. No. 156,196, Nov. 22, 1993, Pat. No. 5,411,641, and Ser. No. 246,909, May 20, 1994, Pat. No. 5,580,437, which is a continuation-in-part of Ser. No. 156,196.

[51] Int. Cl.⁶ .............................................. C25B 9/00
[52] U.S. Cl. ........................ 204/252; 204/282; 204/283; 429/40; 429/44
[58] Field of Search .................... 204/252, 282, 204/283; 429/40, 44

[56] References Cited

U.S. PATENT DOCUMENTS

| | | | |
|---|---|---|---|
| 3,453,187 | 7/1969 | Slatin | 204/69 |
| 3,729,395 | 4/1973 | Caron et al. | 204/59 R |
| 4,139,447 | 2/1979 | Faron et al. | 204/239 |
| 4,169,025 | 9/1979 | Needes | 204/98 |
| 4,191,618 | 3/1980 | Coker et al. | 204/98 |
| 4,210,501 | 7/1980 | Dempsey et al. | 204/129 |
| 4,214,969 | 7/1980 | Lawrance | 204/255 |
| 4,224,121 | 9/1980 | Dempsey et al. | 204/98 |
| 4,294,671 | 10/1981 | Balko | 204/128 |
| 4,311,568 | 1/1982 | Balko | 204/128 |
| 4,338,354 | 7/1982 | Bush et al. | 427/80 |
| 4,561,945 | 12/1985 | Coker et al. | 204/98 |
| 4,595,579 | 6/1986 | Prudhon et al. | 423/487 |
| 4,650,552 | 3/1987 | de Nora et al. | 204/67 |
| 4,655,887 | 4/1987 | Oda et al. | 204/98 |
| 4,666,574 | 5/1987 | Oda et al. | 204/98 |
| 4,724,052 | 2/1988 | Nidola | 204/16 |
| 4,784,923 | 11/1988 | Graham | 428/698 |
| 4,909,912 | 3/1990 | Oda et al. | 204/98 |
| 4,959,132 | 9/1990 | Fedkiw, Jr. | 204/101 |
| 5,223,102 | 6/1993 | Fedkiw, Jr. et al. | 204/78 |
| 5,292,600 | 3/1994 | Kaufman | 429/39 |

FOREIGN PATENT DOCUMENTS

| | | |
|---|---|---|
| 1 179 631 | 12/1984 | Canada . |
| 1 195 949 | 10/1985 | Canada . |
| 0 212 524 | 3/1987 | European Pat. Off. . |
| 0 319 489 | 6/1989 | European Pat. Off. . |
| 0 505 750 | 9/1992 | European Pat. Off. . |
| 0 601 604 | 6/1994 | European Pat. Off. . |
| DT 2 312 297 | 3/1973 | Germany . |
| 56-36873 | 8/1981 | Japan . |
| 3-159064 | 7/1991 | Japan . |
| 6-179993 | 6/1994 | Japan . |
| 68/0834 | of 0000 | South Africa . |
| 363424 | 12/1931 | United Kingdom . |
| 861978 | 3/1961 | United Kingdom . |
| 2 173 218 | 10/1986 | United Kingdom . |

OTHER PUBLICATIONS

Appleby, A.J. et al., Solid Polymer Acid Electrolytes, *Fuel Cell Handbook*, 10, 308–312 ?/1989.

Jewulski, J.R., et al., Solid State Proton Conductors, *Final Report, Work Performed Under Contract No.: DE–AC21–88MC24218 for U.S. Department of Energy*, Jan. 1999, Dec. 1990.

Minz, F.R. (Dr.), HCl–Electrolysis — Technology for Recycling Chlorine, *Bayer AG*, Apr. 21–23, 1993.

Takenaka, H., et al., Solid Polymer Electrolyte Water Electrolysis, *Int. J. Hydrogen Energy*, 7(5), 397–403 ?/1982.

Wilson, M.S. et al., High Performance Catalyzed Membranes of Ultra–low Pt Loadings for Polymer Electrolyte Fuel Cells, *J. Electrochem. Soc.*, 2, L–28–L–30, Feb. 1992.

Munz, W.D., Production of Wear and Corrosion Reducing As Well As Decorative Films by Ionic and Plasma–Supported Vacuum Coated Technologies, *HTM, Haerterei–Tech. Mitt.*, 40(6) 252–6 1–19 (?/1985).

Chemical Abstracts, vol. 101, No. 16, Columbus, Ohio, USA, Abstract No. 134012, Jalan, Vinod M. "Substitutes for carbon in fuel cell applications", p. 194, ?/1984.

*Primary Examiner*—Kathryn Gorgos

[57] ABSTRACT

The invention relates to an electrochemical cell which has an electrode, which may be either an anode or a cathode, and a membrane disposed in contact with one side of the electrode. An anode current bus is disposed on the other side of the anode, and a cathode current bus is disposed on the other side of the cathode. An anode current distributor collects current from the anode current bus and distributes it to the anode by electronic conduction, and a cathode current distributor collects current from the cathode and distributes it to the cathode bus by electronic conduction. The anode or the cathode current distributor is made of a metal which is treated by either nitriding, boriding or carbiding the metal in order to make the metal oxide growth resistant. In particular, the current distributor comprises tantalum that has been nitrided to form $Ta_2N$. The current distributor thus provides a barrier between the current bus and the electrode, and the anolyte, catholyte and products of the cell. This is especially important in aggressive environments, such as hydrogen chloride. Thus, the cell of the present invention is particularly useful in converting anhydrous hydrogen halide directly to essentially dry halogen gas, such as anhydrous hydrogen chloride to chlorine gas, or for converting aqueous hydrogen chloride to wet chlorine gas.

42 Claims, 2 Drawing Sheets

ELECTROCHEMICAL CELL HAVING AN OXIDE GROWTH RESISTANT CURRENT DISTRIBUTOR

This application is a continuation of U.S. application Ser. No. 08/834,014, filed Apr. 11, 1997 still pending, which is a continuation of U.S. application Ser. No. 08/432,403, filed May 1, 1995, now abandoned, which is a continuation-in-part of U.S. application Ser. No. 08/156,196, filed Nov. 22, 1993, now U.S. Pat. No. 5,411,641, issued May 2, 1995 and of U.S. application Ser. No. 08/246,909, filed May 20, 1994, now U.S. Pat. No. 5,580,437, issued on Dec. 3, 1996, which is a continuation-in-part of U.S. application Ser. No. 08/156,196.

BACKGROUND OF THE INVENTION

1. Field of the Invention

The present invention relates to an electrochemical cell having a conductive, dimensionally stable, oxide growth resistant current distributor. The current distributor of the present invention is useful in a process for converting anhydrous hydrogen halide to a halogen gas or in an aqueous electrochemical process. The oxide growth resistant current distributor of the present invention is particularly useful in the very aggressive environment associated with the oxidation of HCl to $Cl_2$, whether in an anhydrous or an aqueous process.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, Apr. 21–Apr. 23, 1993.

Currently, thermal catalytic oxidation processes exist for converting anhydrous HCl and aqueous HCl into chlorine. Commercial processes, known as the "Shell-Chlor", the "Kel-Chlor" and the MT-Chlor"processes, are based on the Deacon reaction. The original Deacon reaction as developed in the 1870's made use of a fluidized bed containing a copper chloride salt which acted as the catalyst. The Deacon reaction is generally expressed as follows:

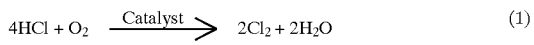
(1)

where the following catalysts may be used, depending on the reaction or process in which equation (1) is used.

| Catalyst | Reaction or Process |
|---|---|
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general, these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electrochemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

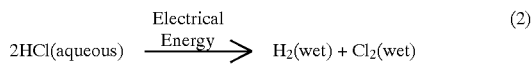
(2)

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

$$2H_2O \rightarrow O_2 + 4H^+ + 4e^- \qquad (3)$$

Further, the presence of water in the Uhde system limits the current densities at which the cells can perform to less than 500 amps./ft.$^2$, because of this side reaction. The side reaction results in reduced electrical efficiency and corrosion of the cell components.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

U.S. Pat. No. 4,294,671, also to Balko, discloses another configuration for an electrochemical cell for processing aqueous HCl. In this cell, niobium current distributing screen elements are positioned between an anode deposited on a membrane and an anode current collector. Metals such as niobium, tantalum, titanium, etc. and alloys thereof are known to have good corrosion resistance and conductivity. However, they are costly. Moreover, valve metals also have a tendency to passivate by the formation of protective surface oxide layers which are very poor conductors. Hence, it is necessary to coat the valve metal with a non-oxide forming material, such as a film of one of the platinum group metals, which further adds to the cost. In addition, the platinum group metals corrode in the presence of chlorides and oxidizing potentials, as is the case when generating chlorine for HCl. As a result, known current collectors use costly materials, require difficult and costly manufacturing procedures and in many ways present problems from a fabrication and cost standpoint.

It is also known to use graphite for a current collector, as disclosed in U.S. Pat. No. 4,294,671 to Balko, or a graphite-polyvinylidene fluoride, sold under the trademark KYNAR® by Elf Atochem North America, Inc. Fluoropolymers, as disclosed in U.S. Pat. No. 4,214,969 to Lawrance. However, it has been found that graphite can be oxidized, due to the side reaction of oxygen generated from water, as expressed in equation (3) above. Moreover, graphite and the best case of graphite-polyvinylidene fluoride have resistivities of $10^{-3}$ ohm·cm and $3\times10^{-3}$ ohm·cm, respectively, which make them relatively poor conductors.

Oda et al., in U.S. Pat. Nos. 4,909,912, 4,666,574 and 4,655,887, recognize the corrosion-resistant properties of a porous layer made of the oxides, hydroxides, nitrides or carbides of certain metals in electrolyzing an aqueous solution of an alkali metal chloride. The porous layer is disposed between a membrane and an anode, which in turn is disposed in contact with the alkali metal chloride. Thus, although corrosion resistant, the porous layer does not act as a corrosion barrier to the alkali metal chloride. Nor does it act as an electronic current conductor, instead acting as an ionic current transmitter.

SUMMARY OF THE INVENTION

The present invention solves the problems of the prior art by providing an electrochemical cell for directly producing essentially dry halogen gas from essentially anhydrous hydrogen halide where the cell has a conductive current distributor which acts as a corrosion-resistant barrier to the essentially dry halogen gas and the essentially anhydrous hydrogen halide. This process allows for direct processing of anhydrous hydrogen halide which is a by-product of manufacturing processes, without first dissolving the hydrogen halide in water. This direct production of essentially dry halogen gas, when done, for example, for chlorine gas, is less capital intensive than processes of the prior art, which require separation of water from the chlorine gas. This direct production of essentially dry chlorine gas also requires lower investment costs than the electrochemical conversions of hydrogen chloride of the prior art. This advantage can translate directly into lower power costs per pound of say, chlorine, generated than in the aqueous electrochemical processes of the prior art. The direct production of essentially dry chlorine gas also provides a process which produces drier chlorine gas with fewer processing steps as compared to that produced by electrochemical or catalytic systems of the prior art, thereby simplifying processing conditions and reducing capital costs.

Applicants have found that making the current distributor of an electrochemical cell from a metal which is nitrided, borided or carbided, or from the nitrided, borided or carbided alloys of such metals results in a current distributor which is dimensionally stable and which resists oxide growth formation. Accordingly, the current distributor of the present invention has a longer life and is thus less costly than known metal current distributors. These advantages make the process of the present invention even more practicable and economically attractive.

To achieve the foregoing solutions, and in accordance with the purposes of the invention as embodied and broadly described herein, there is provided an electrochemical cell for the direct production of essentially dry halogen gas from essentially anhydrous hydrogen halide. The electrochemical cell comprises means for oxidizing molecules of essentially anhydrous hydrogen halide to produce essentially dry halogen gas and protons, cation-transporting means for transporting the protons therethrough, wherein one side of the oxidizing means is disposed in contact with one side of the cation-transporting means; reducing means for reducing the transported protons, wherein the reducing means is disposed in contact with the other side of the cation-transporting means; and current distributing means disposed on the other side of the oxidizing means for distributing current to the oxidizing means by electronic conduction and for allowing current to flow away from the oxidizing means. The current distributing means comprises a metal selected from the group consisting of a nitrided metal, a carbided metal, a borided metal, the nitrided alloys of a metal, the borided alloys of a metal and the carbided alloys of a metal.

DESCRIPTION OF THE PREFERRED EMBODIMENTS

Reference will now be made in detail to the present preferred embodiments of the invention as illustrated in the accompanying drawings.

In accordance with a first and second embodiment of the present invention, there is provided an electrochemical cell for the direct production of essentially dry halogen gas from anhydrous hydrogen halide. Such a cell is shown generally at 10 in FIG. 1. The cell of the present invention will be described with respect to a preferred embodiment of the present invention, which directly produces essentially dry chlorine gas from anhydrous hydrogen chloride. This cell may alternatively be used to produce other halogen gases, such as bromine, fluorine and iodine from a respective anhydrous hydrogen halide, such as hydrogen bromide, hydrogen fluoride and hydrogen iodide. However, hydrogen fluoride may be particularly corrosive when used with the present invention. The term "direct" means that the electrochemical cell obviates the need to remove water from the halogen gas produced or the need to convert essentially anhydrous hydrogen halide to aqueous hydrogen halide before electrochemical treatment. In the first embodiment, chlorine gas, as well as hydrogen, is produced in this cell. In a second embodiment, water, as well as chlorine gas, is produced by this cell, as will be explained more fully below.

Figure 1:
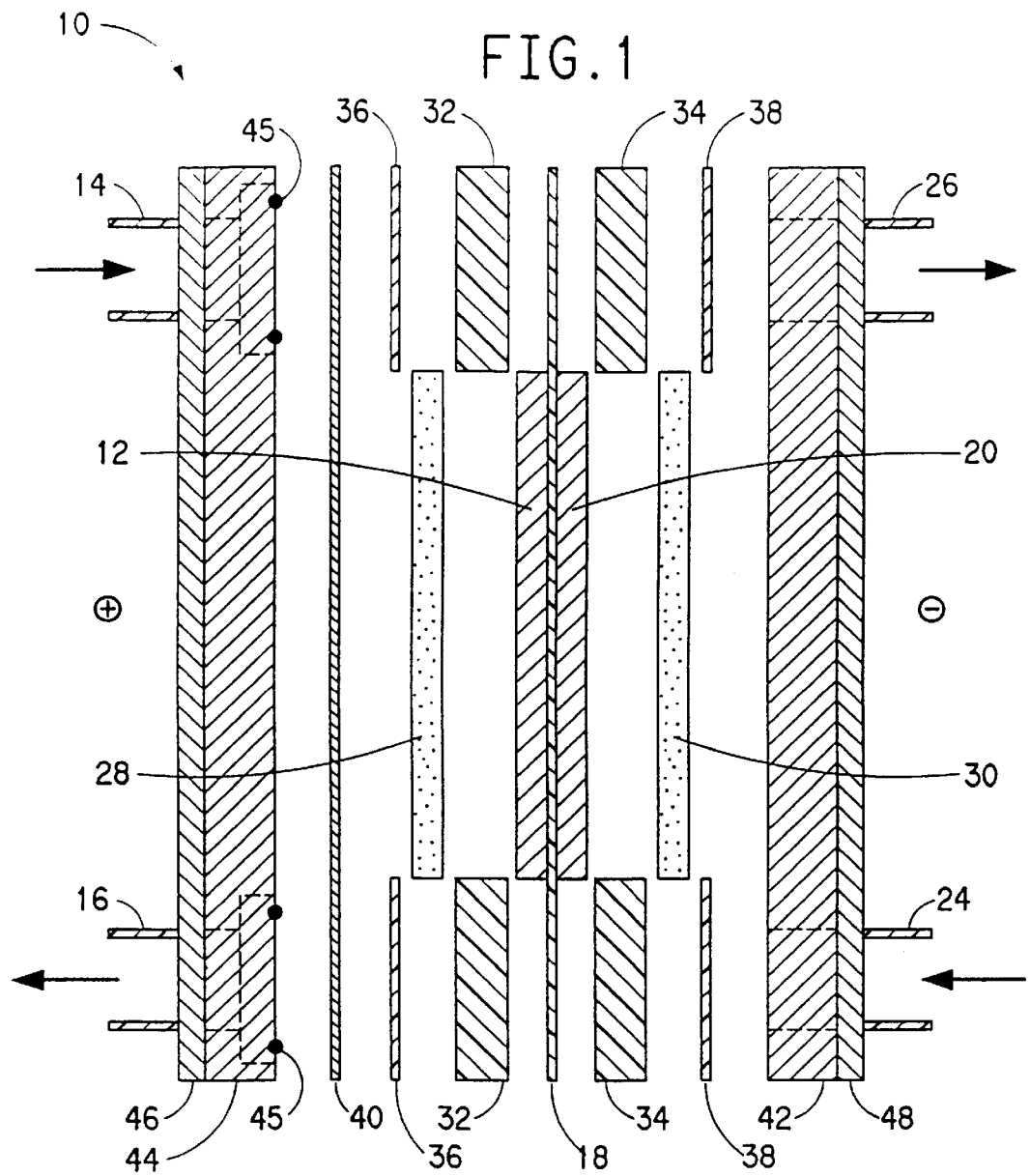
FIG. 1 is an exploded cross-sectional view of an electrochemical cell for producing halogen gas from anhydrous hydrogen halide according to a first and a second embodiment of the present invention.

The electrochemical cell of the first and second embodiments comprises an electrode. Alternatively, the electrochemical cell of the first and second embodiments may be described as comprising means for oxidizing molecules of essentially anhydrous hydrogen halide to produce essentially dry halogen gas and protons. The oxidizing means is an electrode, or more specifically, an anode 12 as shown in FIG. 1. On the anode side, electrochemical cell 10 has an anode-side inlet 14 and an anode-side outlet 16. Since in the preferred embodiment, anhydrous HCl is carried through the inlet, and chlorine gas is carried through the outlet, the inlet and the outlet may be lined with a copolymer of tetrafluoroethylene with (perfluoro)alkyl-vinyl either, sold under the trademark TEFLON® PFA (hereinafter referred to as "PFA", by E. I. du Pont de Nemours and Company of Wilmington, Del. (hereinafter referred to as "DuPont").

The electrochemical cell of the first and second embodiments also comprises a membrane. Alternatively, the electrochemical cell of the first and second embodiments may be described as comprising cation-transporting means for transporting the protons therethrough, where one side of the oxidizing means is disposed in contact with one side of the cation-transporting means. Preferably, the cation-transporting means is a cation-transporting membrane 18 as shown in FIG. 1. More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type $-CE_2CFRSO_3H$ and $-OCF_2CF_2CF_2SO_3H$, where R is an F, Cl, $CF_2Cl$, or a $C_1$ to $C_{10}$ perfluoroalkyl radical. The membrane resin may be, for example, a copolymer of tetrafluoroethylene with $CF_2=CFOCF_2CF(CF_3)OCF_2CF_2SO_3H$. Sometimes those resins may be in the form that has pendant $-SO_2F$ groups, rather than $-SO_3H$ groups. The sulfonyl fluoride groups can be hydrolyzed with potassium hydroxide to $-SO_3K$ groups, which then are exchanged with an acid to $-SO_3H$ groups. Suitable perfluorinated cationic membranes, which are made of hydrated, copolymers of polytetrafluoroethylene and poly-sulfonyl fluoride vinyl ether-containing pendant sulfonic acid groups, are offered by DuPont under the trademark "NAFION" (hereinafter referred to as NAFION®). In particular, NAFION® membranes containing pendant sulfonic acid groups include NAFION® 117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g. NAFION® 324 has a two-layer structure, a 125 $\mu$m-thick membrane having an equivalent weight of 1100 g., and a 25 $\mu$m-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x \cdot Al_2O_3$, in which x ranges from 5 ($\beta$"-alumina) to 11 ($\beta$-alumina). This material and a number of solid electrolytes which are useful for the invention are described in the *Fuel Cell Handbook*, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-\alpha}$) and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

Figure 1A:
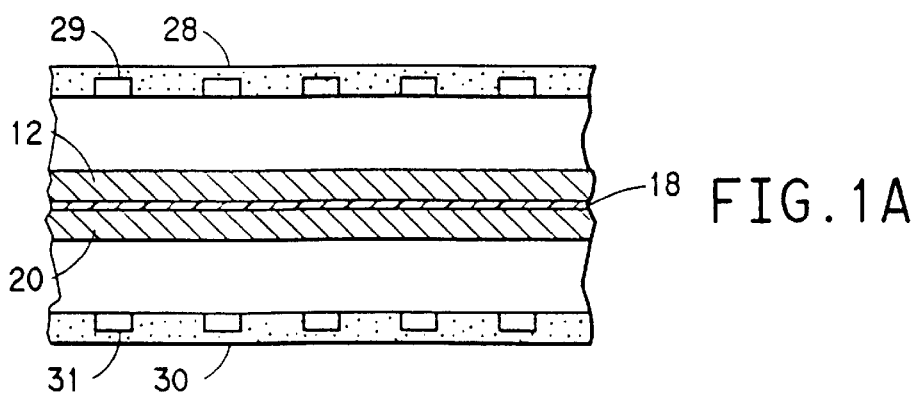
FIG. 1A is a cut-away, top cross-sectional view of the anode and cathode mass flow fields as shown in FIG. 1.

The electrochemical cell of the first and second embodiments also comprises an electrode, or a cathode 20. Alternatively, the electrochemical cell of the first and second embodiments may be described as comprising means for reducing the transported protons, where the reducing means is disposed in contact with the other side of the cation-transporting means. The reducing means comprises a cathode 20, where cathode 20 is disposed in contact with the other side (as opposed to the side which is in contact with the anode) of membrane 18 as illustrated in FIGS. 1 and 1A. Electrochemical cell 10 has a cathode-side inlet 24 and a cathode-side outlet 26 as shown in FIG. 1. Since in the preferred embodiment, anhydrous HCl is processed, and since some chlorides pass through the membrane and consequently, HCl is present on the cathode-side of the cell, the cathode inlet and the outlet may be lined with PFA.

As known to one skilled in the art, if electrodes are placed on opposite faces of membrane, cationic charges (protons in the HCl reaction being described) are transported through the membrane from anode to cathode, while each electrode carries out a half-cell reaction. In the first and second embodiments, molecules of anhydrous hydrogen chloride are transported to the surface of the anode through anode-side inlet 14. The molecules of the anhydrous hydrogen chloride are oxidized to produce essentially dry chlorine gas and protons. The essentially dry chlorine gas exits through anode-side outlet 16 as shown in FIG. 1. The protons, H$^+$, are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores.

In a hot-pressed electrode, the electro-chemically active material may comprise a catalyst material on a support material. The support material may comprise particles of carbon and particles of polytetrafluoro-ethylene, which is sold under the trademark "TEFLON®" (hereinafter referred to as "PTFE") by DuPont. The electrochemically active material may be bonded by virtue of the PTFE to a support structure of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg/cm$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992, where the inks contain solubilized NAFION® to enhance the catalyst-ionomer surface contact and to act as a binder to the NAFION® perfluorinated membrane sheet. With such a system, loadings as low as 0.017 mg active material per cm$^2$ have been achieved.

The electrochemical cell of the first and second embodiments further comprises an anode flow field 28 disposed in contact with the anode and a cathode flow field 30 disposed in contact with the cathode. The flow fields are electrically conductive, and act as both mass and current flow fields. More specifically, the mass flow fields may include a plurality of anode flow channels 29 and a plurality of cathode flow channels 31 as shown in FIG. 1A, which is a cut-away, top cross-sectional view showing only the flow fields of FIG. 1. The purpose of the anode flow field and flow channels 29 formed therein is to get reactants, such as anhydrous HCl in the first and second embodiments, to the anode and products, such as essentially dry chlorine gas from the anode. The purpose of the cathode flow field and flow channels 31 formed therein is to get catholyte, such as liquid water in the first embodiment, or oxygen gas in the second embodiment, to the cathode and products, such as hydrogen gas in the first embodiment, or water vapor (H$_2$O(g)) in the second embodiment, from the cathode. Water vapor may be needed to keep the membrane hydrated. However, water vapor may not be necessary in this embodiment because of the water produced by the electrochemical reaction of the oxygen (O$_2$) added as discussed below. It is within the scope of the present invention that the flow fields and the flow channels may have a variety of configurations. Also, the flow fields may be made in any manner known to one skilled in the art. Preferably, the anode and the cathode flow fields comprise porous graphite paper. The flow fields may also be made of a porous carbon in the form of a foam, cloth or matte.

The electrochemical cell of the first and second embodiments may also comprise an anode mass flow manifold 32 and a cathode mass flow field manifold 34 as shown in FIG. 1. The purpose of such manifolds is to bring anolyte to and products from the anode, and catholyte to and products from the cathode. In addition, the manifolds form a frame around the anode mass flow field and the anode, and the cathode mass flow field and the cathode, respectively. These manifolds are preferably made of a corrosion resistant material, such as PFA. A gasket 36, 38, also contributes to forming a frame around the respective anode and cathode mass flow fields. These gaskets are preferably also made of a corrosion resistant material, such as PTFE.

The electrochemical cell of the first and second embodiments also comprises an anode current bus 46 and a cathode current bus 48 as shown in FIG. 1. The current buses conduct current to and from a voltage source (not shown). Specifically, anode current bus 46 is connected to the positive terminal of a voltage source, and cathode current bus 48 is connected to the negative terminal of the voltage source, so that when voltage is supplied to the cell, current flows through all of the cell components to the right of current bus 46 as shown in FIG. 1, including current bus 48, from which it returns to the voltage source. The current buses are made of a conductor material, such as copper.

The electrochemical cell of the first and second embodiments further comprises anode current distributing means disposed on one side of the electrode, or the oxidizing means, for distributing current to the electrode, or the oxidizing means, by electronic conduction, or the oxidizing means and for allowing the current to flow away from the electrode, or oxidizing means. Alternatively, the current distributing means may be described as means disposed on one side of the electrode, or the oxidizing means, for providing a barrier between the current bus and the electrode, or the oxidizing means, and the hydrogen halide, such as hydrogen chloride and the halogen gas, such as chlorine gas.

Preferably, the anode current distributing means comprises an anode current distributor 40 as shown in FIG. 1. The current distributor comprises a non-porous layer. As noted above, the anode flow field, which is disposed next to the anode current distributor as shown in FIG. 1, brings anolyte, such as anhydrous hydrogen halide in the first and second embodiments, to the anode, and takes products, such as essentially dry chlorine gas in the first and second embodiments, away from the anode. Certain hydrogen halides, such as HCl, are particularly corrosive. Therefore, in accordance with the present invention, the current distributor is treated in order to protect the current bus, which must consistently conduct current and therefore must be able to withstand attack, from such corrosive environments. More particularly, the anode current distributor comprises a metal which has been either nitrided, borided or carbided, or the nitrided, carbided or borided alloys of a metal, meaning the nitrided alloys of a metal, the borided alloys of a metal or the carbided alloys of a metal. In the latter case, the alloy is made first and then the alloy is nitrided, borided or carbided. It should be noted that nitrides, carbides and borides can be co-formed.

The metal of the anode current distributor may be a Group IVB or Group VB metal—i.e., titanium, zirconium, hafnium, vanadium, niobium, tantalum, or the nitrided, carbided or borided alloys thereof, meaning the nitrided, carbided or borided alloys of titanium, zirconium, hafnium, vanadium, niobium or tantalum. Alternatively, the metal may be tungsten, or the nitrided, borided or carbided alloys thereof. In particularly aggressive conditions, it is preferable that the metal be tantalum that has been nitrided to form $Ta_2N$, although other nitride stoichiometries may be acceptable in less aggressive conditions. Nitriding at one atmosphere of nitrogen at 871° C. for one hour gives the preferential $Ta_2N$, although the length of time for nitriding depends on the heat-up and cool down rate of the nitrided metal. Nitrided tantalum, which has a resistivity of $2 \times 10^{-4}$ ohm·cm, provides a material for the current distributor of the present invention which has a lower resistivity than known current collectors. For instance, graphite and graphite-polyvinylidene fluoride have resistivities of $10^{-3}$ ohm·cm and $3 \times 10^{-3}$ ohm·cm, respectively. This provides better conduction in the cell of the present invention as compared to cells of the prior art.

When the metal is treated in accordance with the present invention, for instance, nitrided, the nitrogen penetrates the surface of the metal and forms a metal-nitrogen compound. Although usually only the outer layer of the metal is treated, it is within the scope of the present invention to completely transform the metal to metal nitride, boride or carbide. The nitriding may be done by known techniques. Standard nitriding techniques which are suitable for use with the present invention include chemical vapor deposition (CVD), gas phase reaction or ion plasma reaction. Although the same techniques may be used for carbiding and boriding, it is preferable to use the gas phase reaction technique for carbiding, and the CVD technique for boriding.

The electrochemical cell of the present invention may further comprise cathode current distributing means disposed on one side of the reducing means, or electrode, or more specifically the cathode, for collecting current from the cathode and for distributing current to the cathode bus by electronic conduction. Alternatively, the cathode current distributing means may be described as means disposed on one side of the reducing means, or cathode, for providing a barrier between the cathode current bus and the cathode and the hydrogen halide. This is desirable because there is some migration of hydrogen halide through the membrane. Preferably the cathode current distributing means comprises a cathode current distributor 42 as shown in FIG. 1. The cathode current distributor may comprise a metal. However, the metal for the cathode current distributor need not necessarily be a nitrided, borided or carbided metal or a nitrided, borided or carbided alloy thereof. In the first embodiment, the metal may be a nickel-based alloy, such as UNS10665, sold under the trademark Hastelloy® B-2 by Haynes International. This is because in the first embodiment, in the long run when nitrided, borided or carbided Group IV or VB metals are used, there is hydrogen embrittlement, and an alternative is needed. In the second embodiment, nitrided, borided and carbided metals, including Group IV or VB metals and tungsten can be used, as hydrogen embrittlement is not a problem.

It is within the scope of the present invention that modifications may be made to the current distributors without departing from the spirit of the invention. For instance, the current distributors of the present invention may be corrugated and nitrided, borided or carbided. Alternatively, grooves may be machined in the current bus, and the current distributor may be matched to the grooves in the current bus. This configuration obviates the need for the flow fields, thus providing lower contact resistance.

In the first and second embodiments, the electrochemical cell also comprises a conductive structural support 44 disposed in contact with anode current distributor 40. The support on the anode side is preferably made of UNS31603 (316L stainless steel). A seal 45, preferably in the form of an O-ring made from a perfluoroelastomer, sold in parts under the trademark KALREZ® by DuPont, is disposed between structural support 44 on the anode side and anode current distributor 40. It should be noted that while structural support 44 is shown in front of cathode current bus 46 in FIG. 1, it is within the scope of the present invention for the structural support to be placed behind the anode current bus (i.e., to the left of bus 46 as shown in FIG. 1) and still achieve the same results. The cathode current distributor acts as a corrosion-resistant structural backer on the cathode side. This piece can be drilled and tapped to accept the PFA fitting, which is used for the inlet and outlet.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, current distributors 40 and 42 and all the elements disposed in between as shown in FIG. 1 are repeated along the length of the cell, and current buses are placed on the outside of the stack.

Further in accordance with the first and second embodiments of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. However, as noted above, hydrogen fluoride may be particularly corrosive when used with the present invention. The production of bromine gas and iodine gas can be accomplished when the electrochemical cell is run at elevated temperatures (i.e., about 60° C. and above for bromine and about 190° C. and above for iodine). In the case of iodine, a membrane other than NAFION® should be used.

The operation of the electrochemical cell for the first embodiment, where hydrogen, as well as chlorine gas, is produced by the cell, will now be described as it relates to a preferred embodiment of the process of the present invention, where the anhydrous hydrogen halide is hydrogen chloride. In operation, current flows to the anode bus and anode current distributor 40 collects current from the anode bus and distributes it to the anode by electronic conduction. Molecules of essentially anhydrous hydrogen chloride gas are fed to anode-side inlet 14 and through flow channels 29 in the anode mass flow field 28 and are transported to the surface of anode 12. The molecules are oxidized at the anode under the potential created by the voltage source to produce essentially dry chlorine gas ($Cl_2(g)$) at the anode, and protons ($H^+$). This reaction is given by the equation:

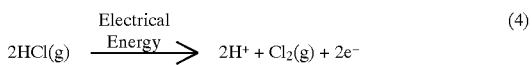

The chlorine gas ($Cl_2(g)$) exits through anode-side outlet 16 as shown in FIG. 1. The protons ($H^+$) are transported through the membrane, which acts as an electrolyte. The transported protons are reduced at the cathode. This reaction for the first embodiment is given by the equation:

$$2H^+ + 2e^- \xrightarrow{\text{Electrical Energy}} H_2(g) \quad (5)$$

Water is delivered to the cathode through cathode-side inlet 24 and through the grooves in cathode flow field 30 to hydrate the membrane and thereby increase the efficiency of proton transport through the membrane. In the first embodiment, the hydrogen which is evolved at the interface between the electrode and the membrane exits via cathode-side outlet 26 as shown in FIG. 1. The hydrogen bubbles through the water and is not affected by the PTFE in the electrode. Cathode current distributor 42 collects current from cathode 20 and distributes it to cathode bus 48.

The operation of the electrochemical cell according to the second embodiment will now be described as it relates to a preferred embodiment of the process of the present invention, where the anhydrous hydrogen halide is hydrogen chloride. In operation, current flows to the anode bus and anode current distributor 40 collects current from the anode bus and distributes it to the anode by electronic conduction. Molecules of essentially anhydrous hydrogen chloride are fed to anode-side inlet 14 and are transported through grooves of anode mass flow field 28 to the surface of anode 12. An oxygen-containing gas, such as oxygen ($O_2(g)$), air or oxygen-enriched air (i.e., greater than 21 mol % oxygen in nitrogen) is introduced through cathode-side inlet 24 and through the grooves formed in cathode mass flow field 30. Although air is cheaper to use, cell performance is enhanced when enriched air or oxygen is used. This cathode feed gas may be humidified to aid in the control of moisture in the membrane. Molecules of the hydrogen chloride (HCl(g)) are oxidized under the potential created by the voltage source to produce essentially dry chlorine gas at the anode, and protons ($H^+$), as expressed in equation (4) above. The chlorine gas ($Cl_2$) exits through anode-side outlet 16 as shown in FIG. 1. The protons ($H^+$) are transported through the membrane, which acts as an electrolyte. Oxygen and the transported protons are reduced at the cathode to water, which is expressed by the equation:

$$\tfrac{1}{2}O_2(g) + 2e^- + 2H^+ \rightarrow H_2O(g) \quad (6)$$

The water formed ($H_2O(g)$ in equation (6)) exits via cathode-side outlet 26 as shown in FIG. 1, along with any nitrogen and unreacted oxygen. The water also helps to maintain hydration of the membrane, as will be further explained below. Cathode current distributor 42 collects current from cathode 20 and distributes it to cathode bus 46.

In this second embodiment, the cathode reaction is the formation of water. This cathode reaction has the advantage of more favorable thermodynamics relative to $H_2$ production at the cathode as in the first embodiment. This is because the overall reaction in this embodiment, which is expressed by the following equation:

$$2HCl(g) + 1/2 O_2(g) \xrightarrow{\text{Electrical Energy}} H_2O(g) + Cl_2(g) \quad (7)$$

involves a smaller free-energy change than the free-energy change for the overall reaction in the first embodiment, which is expressed by the following equation:

$$2HCl(g) \xrightarrow{\text{Electrical Energy}} H_2(g) + Cl_2(g) \quad (8)$$

Thus, the amount of voltage or energy required as input to the cell is reduced in this second embodiment.

In the first and second embodiments, the cathode-side of the membrane must be kept hydrated in order to increase the efficiency of proton transport through the membrane. In the first embodiment, which has a hydrogen-producing cathode, the hydration of the membrane is obtained by keeping liquid water in contact with the cathode. The liquid water passes through the gas-diffusion electrode and contacts the membrane. In the second embodiment, which has a water-producing cathode, the membrane hydration is accomplished by the production of water as expressed by equation (6) above and by the water introduced in a humidified oxygen-feed or air-feed stream. This keeps the conductivity of the membrane high.

In either of the first or second embodiments, the electrochemical cell can be operated over a wide range of temperatures. Room temperature operation is an advantage, due to the ease of use of the cell. However, operation at elevated temperatures provides the advantages of improved kinetics and increased electrolyte conductivity. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C. It should be noted also that one is not restricted to operate the electrochemical cell of either the first or the second embodiment at atmospheric pressure. The cell could be run at differential pressure gradients, which change the transport characteristics of water or other components in the cell, including the membrane.

Figure 2:
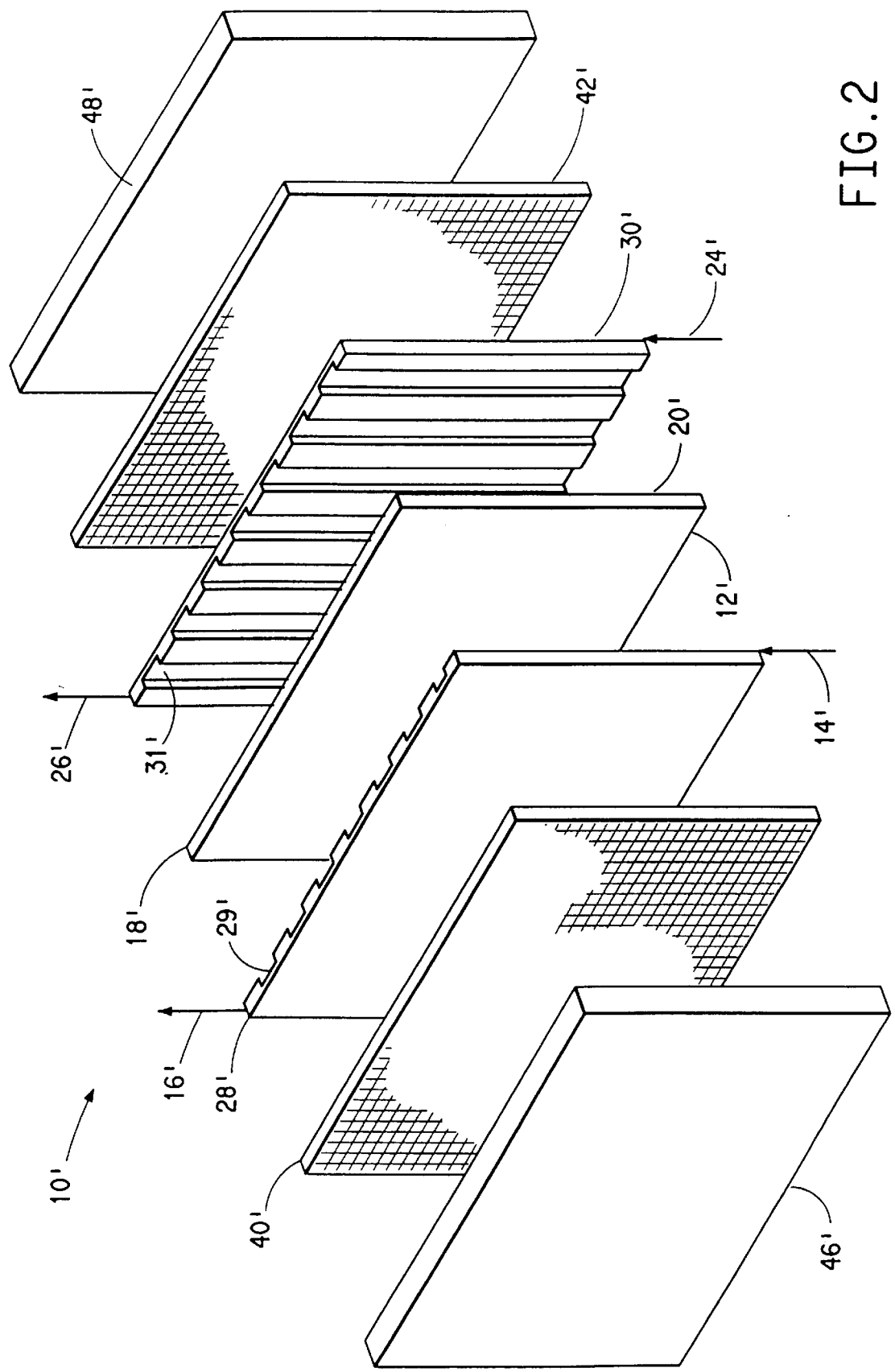
FIG. 2 is a perspective view of an electrochemical cell for producing, for example, halogen gas from aqueous hydrogen halide according to a third embodiment of the present invention.

FIG. 2 illustrates a third embodiment of the present invention. Wherever possible, elements corresponding to the elements of the embodiment of FIG. 1 will be shown with the same reference numeral as in FIG. 1, but will be designated with a prime ('). An electrochemical cell of the third embodiment is shown generally at 10' in FIG. 2. The electrochemical cell of the third embodiment will be described with respect to a preferred embodiment, where halogens, such as chlorine, are generated by the electrolysis of an aqueous solution of a hydrogen halide, such as hydrochloric acid. However, one could also use this cell for other uses, for instance, in a chlor-alkali system, with brine and hydrochloric acid. Alternatively, this cell could be used as a fuel cell.

The electrochemical cell of the third embodiment comprises an electrode, or more specifically, an anode 12' or a cathode 20'. The electrochemical cell of the third embodiment also comprises a membrane disposed in contact with one side of the electrode. A membrane 18' is shown in FIG. 2 having one side disposed in contact with one side of anode 12'. Unlike the membrane in the first embodiment, the membrane need not necessarily be a cation-transporting membrane. Cathode 20' is disposed in contact with the other side (as opposed to the side which is in contact with the anode) of membrane as illustrated in FIG. 2.

The electrochemical cell of the third embodiment further comprises a mass flow field disposed in contact with the electrode. The mass flow field may be an anode mass flow field 28' disposed in contact with the anode, or a cathode mass flow field 30' disposed in contact with the cathode. The mass flow fields act as both mass and current flow fields. The purpose of the anode flow field is to get anolyte, such as aqueous HCl in the third embodiment to the anode and products, such as wet chlorine gas, from the anode. The purpose of the cathode flow field is to get catholyte to and product, such as hydrogen gas, from the cathode. More specifically, the mass flow fields include flow channels, or grooves, 29' and 31' as shown in FIG. 2.

The electrochemical cell of the third embodiment also comprises a current bus for conducting current to the electrode, where the current bus is disposed on the other side of the electrode. An anode current bus 46' and a cathode current bus 48' are shown in FIG. 2. The current buses conduct current from a voltage source (not shown). Specifically, anode current bus 46' is connected to the positive terminal of a voltage source, and cathode current bus 48' is connected to the negative terminal of the voltage source, so that when voltage is supplied to the cell, current flows from the voltage source through all of the elements to the right of current bus 46' as shown in FIG. 2, including current bus 48' from which it returns to the voltage source. As in the first two embodiments, the current buses of the third embodiment are made of a conductor material, such as copper.

The electrochemical cell of the third embodiment further comprises a current distributor disposed on the other side of the electrode (as opposed to the side which is in contact with the membrane). An anode current distributor 40' is disposed on one side of anode 12', and a cathode current distributor 42' is disposed on one side of cathode 20'. As in the first two embodiments, the anode current distributor distributes current to the anode by electronic conduction and allows current to flow away from the anode. The cathode current distributor distributes current to the cathode by electronic conduction and allows current to flow to the cathode. The anode and the cathode current distributors preferably each comprise a non-porous layer. Moreover, as in the first two embodiments, the anode current distributor provides a barrier between the anode current bus and the reactant, such as aqueous hydrogen chloride and the product, such as wet gaseous chlorine. The cathode current distributor provides a barrier between the cathode current bus and the catholyte. The current distributors of the third embodiment are made of the same materials as described above for the first embodiment. Thus, the anode and the cathode current distributor may comprise a metal which has been either nitrided, borided or carbided, or the nitrided, carbided or borided alloys of a metal, meaning the nitrided alloys of a metal, the borided alloys of a metal, or the carbided alloys of a metal. In the latter case, the alloy is made first and then the alloy is nitrided, borided or carbided. Alternatively, the cathode current distributor may comprise a metal which is not necessarily nitrided, borided or carbided, such as a nickel-based alloy. The choice of material would depend on the choice of anolyte and catholyte.

As known to one skilled in the art, if electrodes are placed on opposite faces of membrane, cationic charges (protons in the HCl reaction being described) are transported through the membrane from anode to cathode, while each electrode carries out a half-cell reaction. In the third embodiment, hydrochloric acid, which is introduced at arrow 14', which indicates the anode-side inlet, is electrolyzed at anode 12' to produce gaseous wet chlorine and hydrogen ions ($H^+$). The gaseous wet chlorine exits at arrow 16', which represents the anode-side outlet. The $H^+$ ions are transported across membrane 18' to cathode 20' along with some water and some hydrochloric acid. The hydrogen ions are discharged at the cathode through a cathode-side outlet 26'. An optional cathode-side inlet is shown at 24'.

The invention will be clarified by the following Examples, which are intended to be purely exemplary of the invention. Example 1 shows the use of a nitrided current distributor in an aqueous environment, such as that described in the third embodiment above. Examples 4–7, 9 and 10 show that the anodic activity (i.e., the oxidation of reactants) on a current distributor does not degrade cell performance. During start-up of either an anhydrous or an aqueous electrochemical cell, the current distributor will act like an anode. These Examples also show that a metal treated in accordance with the present invention (i.e., nitrided, borided or carbided) does not oxidize when exposed to HCl solution and oxidizing potentials. Moreover, these Examples show that it is within the scope of the present invention that the anode may comprise a nitrided, borided or carbided metal, or the nitrided, borided or carbided alloys thereof.

The electrode/membrane assemblies used in the following Examples are commercially available from Giner, Inc. of Waltham, Mass., as membrane and electrode assemblies (MEAs) containing 0.35 mg. precious metal per cm.$^2$ and integrally bonded to a NAFION® 117 membrane in the $H^+$ form. Electrodes as described in U.S. Pat. No. 4,210,501 may also be used with the present invention. It is also within the scope of the present invention to use other known metallization techniques in making electrodes for use with the present invention. For example, the technique used in U.S. Pat. No. 4,959,132 to Fedkiw, frequently referred to as Impregnation-Reduction, is an appropriate method to use with the present invention. Alternatively, the metallization technique may be used, as described in Japanese Publication No. 38934, published in 1980 and J. Hydrogen Energy, 5, 397 (1982).

EXAMPLE 1

In this Example, essentially anhydrous HCl was fed to a 50 cm$^2$ cell at 1 standard liter per minute (SLPM). The cell design was that shown in FIG. 1, where a nitrided tantalum current distributor was used on the anode side (for current distributor 40 as shown in FIG. 1). A current density of 8000 A/m$^2$ was obtained when a potential of 4.4 V was applied across the copper buses. The anode outlet was briefly directed to a potassium iodide bath to confirm the generation of chlorine from the HCl. The cell was operated for a total of 7.5 hours at current densities ranging from 1000 A/m$^2$ to 10,000 A/m$^2$. The cell was disassembled, and the nitrided tantalum current distributor showed no signs of oxidation in the active cell area.

EXAMPLE 2

An electrochemical cell and 20% HCl at 80° C. was used to test nitrided tantalum (Ta) as an anode current distributor used in an aqueous process in an electrochemical cell, such as that described in the third embodiment above. The anode was Pt and the cathode was UNS N10665 nickel-based alloy. The cell was operated at a constant potential of 2 V. When the Pt anode was directly connected to the anode bus, the average current density over a 24 hour period was 390 mA/cm$^2$. When the nitrided tantalum current distributor was inserted between the anode bus and the Pt anode, the average current density over a 24 hour period was 390 mA/cm$^2$. The thin gage and the nitriding combined to create a low resistivity current distributor. The Ohmic (IR) loss from the nitrided Ta current distributor was approximately 1 $\mu$V.

EXAMPLE 3

In this control example, an electrochemical cell and 37% HCl at 60° C. was used to study current distributor materials. The anode was tantalum (Ta) and the cathode was platinum (Pt). A potential of 2 V was applied between the anode and cathode for 62 hours and the current was measured versus time. The cell was swept with nitrogen and the off gas purged through potassium iodide (KI). The KI was then titrated to determine the amount of $Cl_2$ generated.

The average current density was 2 $\mu A/cm^2$ for 62 hours at 2 V. There was a rapid decay in the current at the start of the test followed by a very slow decay. There was very little $Cl_2$ generated during the 62 hour test. A visual examination of the Ta anode showed an oxide film formed during the test.

Surface analyses were run to determine the amount of oxide growth. Outside the electrochemically tested area, the oxide thickness was 10 nm. In the electrochemically tested area, the $Ta_2O_5$ oxide penetrated to a depth of 120 nm. The oxygen level decayed from stoichiometric $Ta_2O_5$ at 120 nm to nearly zero at a depth of 200 nm.

EXAMPLE 4

In this Example, an electrochemical cell and 37% HCl at 60° C. was used to study current distributor materials. The anode was TaN CVD deposited on Ta, and the cathode was Pt. A potential of 2 V was applied for 4 hours and 3 V was applied for 60 hours. The potential was measured between the anode and cathode, and the current was measured versus time. The cell was swept with nitrogen and the off gas purged through KI.

The average current density was 14.5 $\mu A/cm^2$ at 2 V and 16 $\mu A/cm^2$ at 3 V. A microscopic examination of the anode showed a pale brown tint to the surface. The KI turned yellow, indicating a small amount of $Cl_2$ was generated. While not a very active catalyst surface, TaN has a resistivity of 200 $\mu Ohm \cdot cm$, making it a suitable current distributor.

EXAMPLE 5

In this Example, an electrochemical cell and 37% HCl at 60° C. was used to study current distributor materials. The anode was 60% tantalum, 40% niobium (nitrided Ta40Nb). It had a 10 nm surface layer of TaN/NbN, (tantalum nitride/niobium nitride) a 300 nm transition zone from the 1:1 to the 2:1 metal to nitrogen ratio and a $Ta_2N/Nb_2N$ (tantalum nitride/niobium nitride) layer approximately 1500 nm thick. The cathode was Pt. A potential of 2 V was applied for 4 hours, 3 V was applied for 60 hours, and the current was measured versus time. The cell was swept with nitrogen and the off gas purged through KI.

The average current density as 0.13 $\mu A/cm^2$ at 2 V and 0.1 $\mu A/cm^2$ at 3 V. A microscopic examination of the anode showed no visible changes to the surface. A surface analysis showed a minor 10 atomic % oxygen spike to a depth of 15 nm ($Ta_2O_5$ is 71 atomic % oxygen). The KI showed some color change indicating $Cl_2$ was produced. The addition of Nb is done to reduce the cost of the current distributor versus pure Ta.

EXAMPLE 6

In this Example, an electrochemical cell and 37% HCl at 60° C. was used to study current distributor materials. The anode was gas phase nitrided Ta. It had a 10 nm thick surface layer of TaN, a 30 nm transition zone from TaN to $Ta_2N$ and a $Ta_2N$ layer approximately 300 nm thick. A cathode was Pt. A potential of 2 V was applied for 4 hours, 3 V was applied for 60 hours and the current was measured versus time. The cell was swept with nitrogen and the off gas purged through KI.

The average current density was 0.008 $\mu A/cm^2$ for the 4 hours at 2 V and 0.06 $\mu A/cm^2$ for the 60 hours at 3 V. There was some $Cl_2$ generated during the two tests as evidenced by the KI turning pale yellow. A visual examination of the nitrided Ta anode showed no visible change. A surface analysis showed that oxygen penetrated the sample to a depth of about 10 nm and a concentration of 20 atomic %. The oxygen concentration fell below 10 atomic % before reaching a depth of 30 nm.

EXAMPLE 7

In this Example, an electrochemical cell and 37% HCl at 60° C. was used to study current distributor materials. The anode was gas phase nitrided Ta. It had a TaN layer approximately 125 nm thick, a 450 nm transition zone from TaN to $Ta_2N$ and a 1000 nm thick $Ta_2N$ zone. The cathode was Pt. A potential of 2 V was applied for 4 hours and 3 V was applied for 60 hours and the current was measured versus time. The cell was swept with nitrogen and the off gas purged through KI.

The average current density was 2.16 $mA/cm^2$ for the 4 hours at 2 V and 22 $\mu A/cm^2$ for 60 hours at 3 V. There was some $Cl_2$ generated during the two tests as evidenced by the KI turning pale yellow. A visual examination of the nitrided Ta anode showed a pale blue tint in the test area. A surface analysis showed that oxygen penetrated the sample to a depth of 80 nm and a concentration of 71 atomic % ($Ta_2O_5$). The oxygen level was below 10 atomic % at a depth of 120 nm.

EXAMPLE 8

In this control Example, an electrochemical cell and 37% HCl at 22° C. was used to study current distributor materials. The anode was graphite and the cathode was Pt. The applied potential was either 2 V or 3 V and was applied between the anode and cathode. The current was measured versus time. The cell was swept with nitrogen and the off gas purged through KI to detect $Cl_2$ formation.

The average current when 2 V was applied, was 220 $mA/cm^2$ and the graphite was unattacked. At 3 V, the average current density jumped to 980 $mA/cm^2$ and the graphite was heavily attacked. This attack occurred on nuclear grade (fine grain) graphite, coarse grained graphite and graphite coated with pyrolitic carbon. At both potentials there was substantial $Cl_2$ generation as detected by the KI solution.

Graphite attack at 3 V was prevented by restricting the current density through use of a small cathode. By using a lower HCl concentration, the severity of the attack was increased. These results are supported in the literature which shows that graphite oxidizes to CO and $CO_2$ and that HCl acts as an inhibitor for this reaction.

Graphite is not an ideal current distributor due to its being attacked during cell operation. Despite this shortcoming, it has been used in aqueous HCl to $Cl_2$ electrolysis. The resistivity of graphite is $1.4 \times 10^{-3}$ $Ohm \cdot cm$ at 0° C.

EXAMPLE 9

In this Example, an electrochemical cell and 37% HCl at 22° C. was used to study current distributor materials. The anode was titanium carbide and the cathode was Pt. A potential of 2 V was applied to the cell and the current was measured versus time. The cell was swept with nitrogen and the off gas purged through KI to detect $Cl_2$ formation.

The average current density was 0.8 mA/cm$^2$ for the 30 minute test. The KI remained clear indicating no $Cl_2$ was detected. There was no visible attack of the surface, though it had the appearance of being somewhat smoother after the testing. While not a catalytically active surface, its low resistivity of only 60 μOhm·cm makes it suitable as current distributor.

EXAMPLE 10

In this Example, an electrochemical cell and 37% HCl at 60° C. was used to study current distributor materials. The anode was $TaB_2$ CVD deposited on Ta and the cathode was Pt. A potential of 2 V was applied to the cell for 4 hours and 3 V was applied for 60 hours. The current was measured versus time. The cell was swept with nitrogen and the off gas purged through KI to detect $Cl_2$ formation.

The average current density was 0.7 μA/cm$^2$ for the 4 hour test and 0.06 μA/cm$^2$ for the 60 hour test. The KI turned golden brown indicating $Cl_2$ was generated. There was no visible attack of the surface, though it did appear to form a very slight tint. Surface analysis showed that the oxide film growth was limited to 15 nm.

Additional advantages and modifications will readily occur to those skilled in the art. The invention, in its broader aspects, is therefore not limited to the specific details, representative apparatus and illustrative Examples shown and described. Accordingly, departures may be made from such details without departing from the spirit or scope of the general inventive concept as defined by the appended claims and their equivalents.

What is claimed is:

1. An electrochemical cell for the direct production of essentially dry halogen gas from essentially anhydrous hydrogen halide, comprising:

(a) means for oxidizing molecules of essentially anhydrous hydrogen halide to produce essentially dry halogen gas and protons;

(b) cation-transporting means for transporting the protons therethrough, wherein one side of the oxidizing means is disposed in contact with one side of the cation-transporting means;

(c) reducing means for reducing the transported protons, wherein the reducing means is disposed in contact with the other side of the cation-transporting means; and (d) current distributing means disposed on the other side of the oxidizing means for distributing current to the oxidizing means by electronic conduction and for allowing current to flow away from the oxidizing means, wherein the current distributing means comprises a metal selected from the group consisting of a nitrided metal, a carbided metal, a borided metal, the nitrided alloys of a metal, the borided alloys of a metal and the carbided alloys of a metal.

2. An electrochemical cell for the direct production of essentially dry halogen gas from essentially anhydrous hydrogen halide, comprising:

(a) means for oxidizing molecules of essentially anhydrous hydrogen halide to produce essentially dry halogen gas and protons;

(b) cation-transporting means for transporting the protons therethrough, wherein one side of the oxidizing means is disposed in contact with one side of the cation-transporting means;

(c) reducing means for reducing the transported protons, wherein the reducing means is disposed in contact with the other side of the cation-transporting means;

(d) a current bus disposed on the other side of the oxidizing means; and (e) current distributing means disposed on the other side of the oxidizing means for providing a barrier between the current bus and the oxidizing means and the essentially anhydrous hydrogen halide and the halogen gas, wherein the current distributing means comprises a metal selected from the group consisting of a nitrided metal, a carbided metal, a borided metal, the nitrided alloys of a metal, the borided alloys of a metal and the carbided alloys of a metal.

3. The electrochemical cell of any of claims 1 or 2, wherein the oxidizing means is an anode, the cation-transporting means is a membrane, the reducing means is a cathode and the current distributing means is an anode current distributor.

4. The electrochemical cell of claim 3, wherein the current distributor comprises a non-porous layer.

5. The electrochemical of any of claims 3, wherein the metal is selected from the group consisting of titanium, zirconium, hafnium, vanadium, niobium, tantalum and the alloys thereof.

6. The component of claim 5, wherein the metal is tantalum that has been nitrided to form $Ta_2N$.

7. The electrochemical cell of any of claim 3, wherein the metal is selected from the group consisting of the nitrided alloys of tungsten, the borided alloys of tungsten and the carbided alloys of tungsten.

8. The electrochemical cell of claim 3, further including a cathode current bus disposed on the other side of the cathode and a cathode current distributor comprising a non-porous layer disposed between the cathode current bus and the cathode, wherein the cathode current distributor collects current from the cathode and distributes current to the cathode bus by electronic conduction.

9. The electrochemical cell of claim 8, wherein the cathode current distributor comprises a metal.

10. The electrochemical cell of claim 9, wherein the metal of the cathode current distributor is a nickel-based alloy.

11. The electrochemical cell of claim 9, wherein the metal of the anode current distributor is selected from the group consisting of titanium, zirconium, hafnium, vanadium, niobium, tantalum and the alloys thereof.

12. The electrochemical cell of claim 11, wherein the metal of the anode current distributor is tantalum that has been nitrided to form $Ta_2N$.

13. The electrochemical cell of claim 9, wherein the metal of the anode current distributor is tungsten.

14. The electrochemical cell of claim 3, further comprising an anode mass flow field disposed in contact with the anode, and a cathode mass flow field disposed in contact with the cathode.

15. The electrochemical cell of claim 14, wherein the anode and the cathode mass flow fields have flow channels formed therein, and the flow channels of the anode mass flow field and the flow channels of the cathode mass flow field are parallel to each other.

16. The electrochemical cell of claim 15, wherein the flow channels of the anode mass flow field and of the cathode mass flow field are both vertical.

17. The electrochemical cell of claim 15, further including a cathode-side inlet disposed in fluid communication with the flow channels of the cathode mass flow field for delivering a fluid to the cathode to hydrate the membrane.

18. The electrochemical cell of claim 17, wherein each of the anode and the cathode comprise an electrochemically active material.

19. The electrochemical cell of claim 18, wherein the anode and the cathode are gas diffusion electrodes.

20. The electrochemical cell of claim 19, wherein the catalyst loading of the electrochemically active material is in the range of 0.1 to 0.50 mg/cm$^2$.

21. The electrochemical cell of claim 18, wherein the electrochemically active material comprises one of the following: platinum, ruthenium, osmium, rhenium, rhodium, iridium, palladium, gold, titanium and zirconium, and the oxides, alloys and mixtures thereof.

22. The electrochemical cell of claim 21, wherein the electrochemically active material is applied as a film from ink onto the membrane.

23. The electrochemical cell of claim 22, whereon the loading of the electrochemically active material is at least about 0.017 mg/cm$^2$.

24. The electrochemical cell of claim 21, wherein the cation-transporting membrane is a proton-transporting membrane.

25. The electrochemical cell of claim 24, wherein the proton-transporting membrane comprises a copolymer of tetrafluoroethylene and poly-sulfonyl fluoride vinyl ether-containing pendant sulfonic acid groups.

26. The electrochemical cell of claim 25, wherein the electrochemically active material of the anode and the cathode is platinum.

27. The electrochemical cell of claim 25, wherein the electrochemically active material of the anode is ruthenium oxide.

28. The electrochemical cell of claim 27, wherein the electrochemically active material of the cathode is platinum.

29. The electrochemical cell of claim 25, wherein the current distributor is an anode current distributor comprising nitrided tantalum.

30. The electrochemical cell of claim 25, wherein the current distributor is an anode current distributor comprising tantalum that has been nitrided to form Ta$_2$N.

31. The electrochemical cell of claim 18, wherein the electrochemically active material of the cathode is platinum.

32. The electrochemical cell of claim 31, wherein the electrochemically active material is bonded to a support structure.

33. The electrochemical cell of claim 32, wherein the support structure comprises carbon paper.

34. The electrochemical cell of claim 32, wherein the support structure comprises graphite cloth.

35. The electrochemical cell of claim 32, wherein the electrochemically active material comprises a catalyst material on a support material.

36. The electrochemical cell of claim 35, wherein the support material comprises particles of carbon and particles of polytetrafluoroethylene.

37. The electrochemical cell of claim 36, wherein the electrochemically active material is bonded by the particles of polytetrafluoroethylene to the support structure.

38. An electrochemical cell, comprising:
 (a) a first electrode;
 (b) a membrane having one side thereof disposed in contact with one side of the first electrode;
 (c) a second electrode disposed in contact with the other side of the membrane; and
 (d) a first non-porous current distributor disposed on the other side of the first electrode comprising tantalum that has been nitrided to form Ta$_2$N.

39. The electrochemical cell of claim 38, wherein the first electrode is an anode, and the current distributor is an anode current distributor.

40. The electrochemical cell of claim 39, further including the second electrode as a cathode having one side disposed in contact with the other side of the membrane and a cathode current distributor disposed on the other side of the cathode.

41. The electrochemical cell of claim 40, wherein the cathode current distributor comprises a nickel-based alloy.

42. The electrochemical cell of claim 38, wherein the second electrode is a cathode, and the current distributor is a cathode current distributor.

\* \* \* \* \*